United States Patent
Kim

(10) Patent No.: US 8,393,495 B2
(45) Date of Patent: Mar. 12, 2013

(54) DISPENSER OF AUTOMATICALLY DISTRIBUTING VARIOUS SHAPED TABLETS IN MEDICINE PACKING MACHINE AND TABLET DISPENSING METHOD THEREOF

(75) Inventor: Ho-yeon Kim, Anyang-si (KR)

(73) Assignee: Cretem Co., Ltd., Anyang-si (KR)

( * ) Notice: Subject to any disclaimer, the term of this patent is extended or adjusted under 35 U.S.C. 154(b) by 337 days.

(21) Appl. No.: 12/673,048

(22) PCT Filed: Sep. 19, 2008

(86) PCT No.: PCT/KR2008/005546
§ 371 (c)(1),
(2), (4) Date: Feb. 11, 2010

(87) PCT Pub. No.: WO2009/038378
PCT Pub. Date: Mar. 26, 2009

(65) Prior Publication Data
US 2012/0006843 A1 Jan. 12, 2012

(30) Foreign Application Priority Data

Sep. 21, 2007 (KR) .......................... 10-2007-0096849
Oct. 30, 2007 (KR) .......................... 10-2007-0109845
Apr. 29, 2008 (KR) .......................... 10-2008-0039997

(51) Int. Cl.
*B65B 35/14* (2006.01)
*B65B 35/06* (2006.01)
*G06F 19/00* (2006.01)
*A61J 7/02* (2006.01)

(52) U.S. Cl. .............. 221/13; 221/14; 221/10; 221/200; 221/9; 221/12; 700/236

(58) Field of Classification Search ................... 221/200, 221/10, 13, 14, 201, 9, 12; 700/236, 240, 700/242, 243
See application file for complete search history.

(56) References Cited

U.S. PATENT DOCUMENTS 3,085,831 A * 4/1963 Mylting .......................... 406/65
3,386,618 A * 6/1968 Gilbert ............................. 221/12
3,618,819 A * 11/1971 Blackburn et al. ................ 221/2
(Continued)

FOREIGN PATENT DOCUMENTS

DE 1173839 7/1964
EP 0549533 A1 6/1993
(Continued)

OTHER PUBLICATIONS

European Search Report issued Jun. 14, 2012 in counterpart European application No. 08831548.6 (4 pages, in English).

*Primary Examiner* — Michael K Collins
(74) *Attorney, Agent, or Firm* — NSIP Law

(57) ABSTRACT

Provided are an automatic tablet dispenser of an automatic medicine packing machine, and a tablet supply method thereof, which are capable of automatically packing various-shaped tablets, and accurately, cleanly and rapidly distributing the tablets without missing any. The automatic table dispenser which is installed in a medicine packing machine for automatically packing tablets, includes: a body including a space for containing the tablets therein and a guide track for guiding the tablets contained in the space upward from a bottom of the body; and a driver vibrating the body so that the tablets contained in the space of the body are transferred upward along the guide track.

20 Claims, 16 Drawing Sheets

U.S. PATENT DOCUMENTS

| | | | |
|---|---|---|---|
| 3,677,437 A | | 7/1972 | Haigler |
| 3,746,211 A | * | 7/1973 | Burgess, Jr. .................. 221/7 |
| 4,402,349 A | * | 9/1983 | Engert et al. .................. 141/9 |
| 4,427,136 A | * | 1/1984 | MacKay et al. ............... 222/368 |
| 5,269,440 A | * | 12/1993 | Bohnert et al. ............... 221/200 |
| 5,350,324 A | * | 9/1994 | Guilbert ........................ 439/894 |
| 5,429,160 A | | 7/1995 | Bardoff et al. |
| 5,473,703 A | * | 12/1995 | Smith ........................... 382/143 |
| 5,743,639 A | * | 4/1998 | Puerner et al. ............. 366/182.1 |
| 5,765,728 A | * | 6/1998 | Simpson et al. ............ 222/146.2 |
| 6,554,157 B2 | * | 4/2003 | Geltser et al. ................. 221/200 |
| 6,568,151 B2 | | 5/2003 | Buckley et al. |
| 6,640,158 B1 | * | 10/2003 | Brandt, Jr. ..................... 700/240 |
| 6,684,914 B2 | * | 2/2004 | Gershman et al. ............... 141/2 |
| 6,799,684 B2 | * | 10/2004 | Wooldridge .................. 209/551 |
| 6,805,259 B2 | * | 10/2004 | Stevens et al. ................. 221/124 |
| 7,004,353 B2 | * | 2/2006 | Yamamoto et al. ............ 221/277 |
| 7,571,023 B2 | * | 8/2009 | Mitchell et al. ............... 700/236 |
| 2002/0134790 A1 | | 9/2002 | Tamaoki |
| 2010/0205002 A1 | * | 8/2010 | Chambers ......................... 705/2 |

FOREIGN PATENT DOCUMENTS

| | | |
|---|---|---|
| GB | 969609 | 9/1964 |
| JP | 07-125703 | 5/1995 |
| JP | 2006-206090 | 8/2006 |
| KR | 10-2000-0067077 A | 11/2000 |
| KR | 10-2004-0015386 A | 2/2004 |
| KR | 10-2005-0059422 | 6/2005 |
| KR | 10-2007-0015244 | 2/2007 |

* cited by examiner

[Fig. 1]
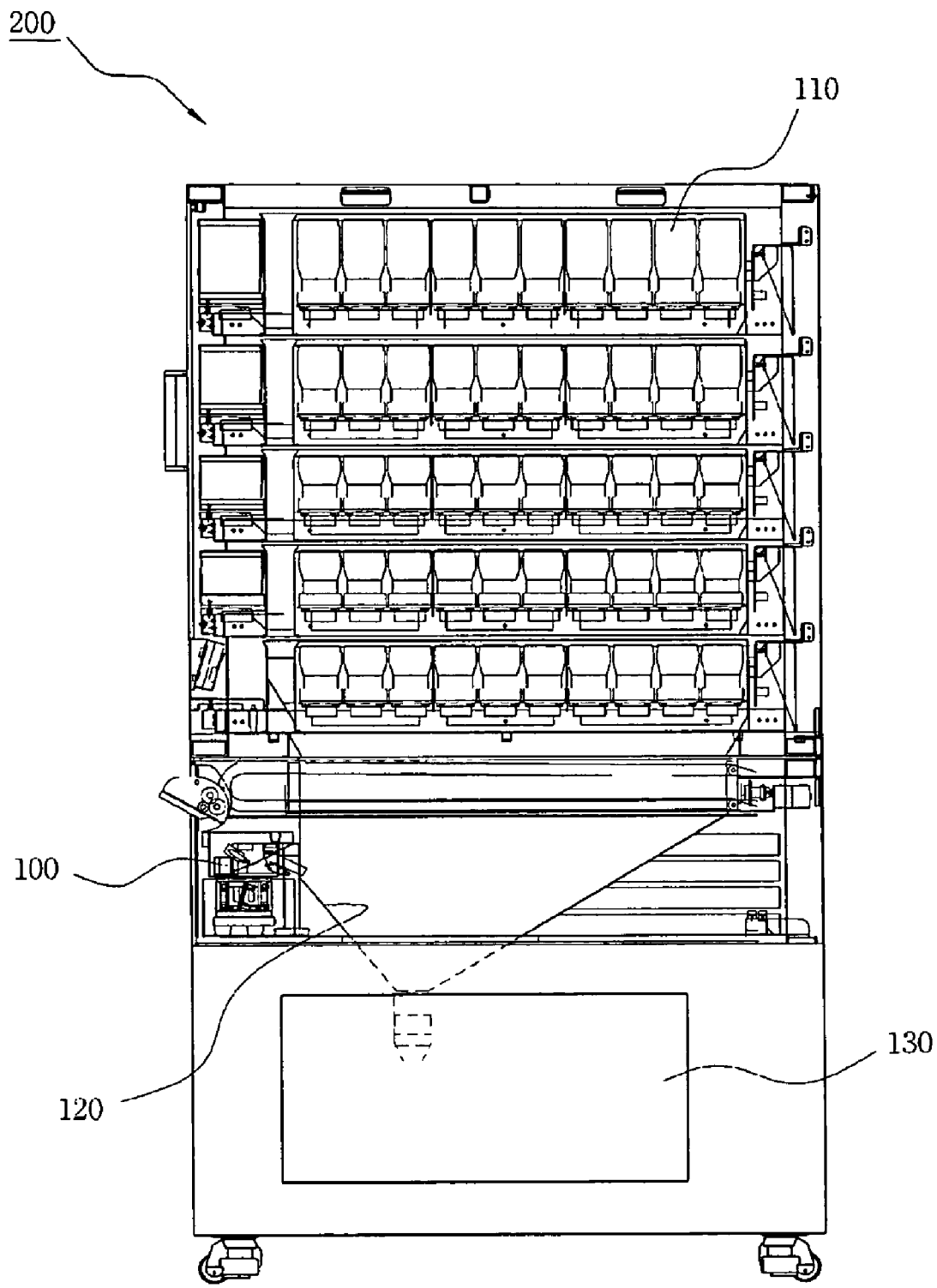

[Fig. 2]
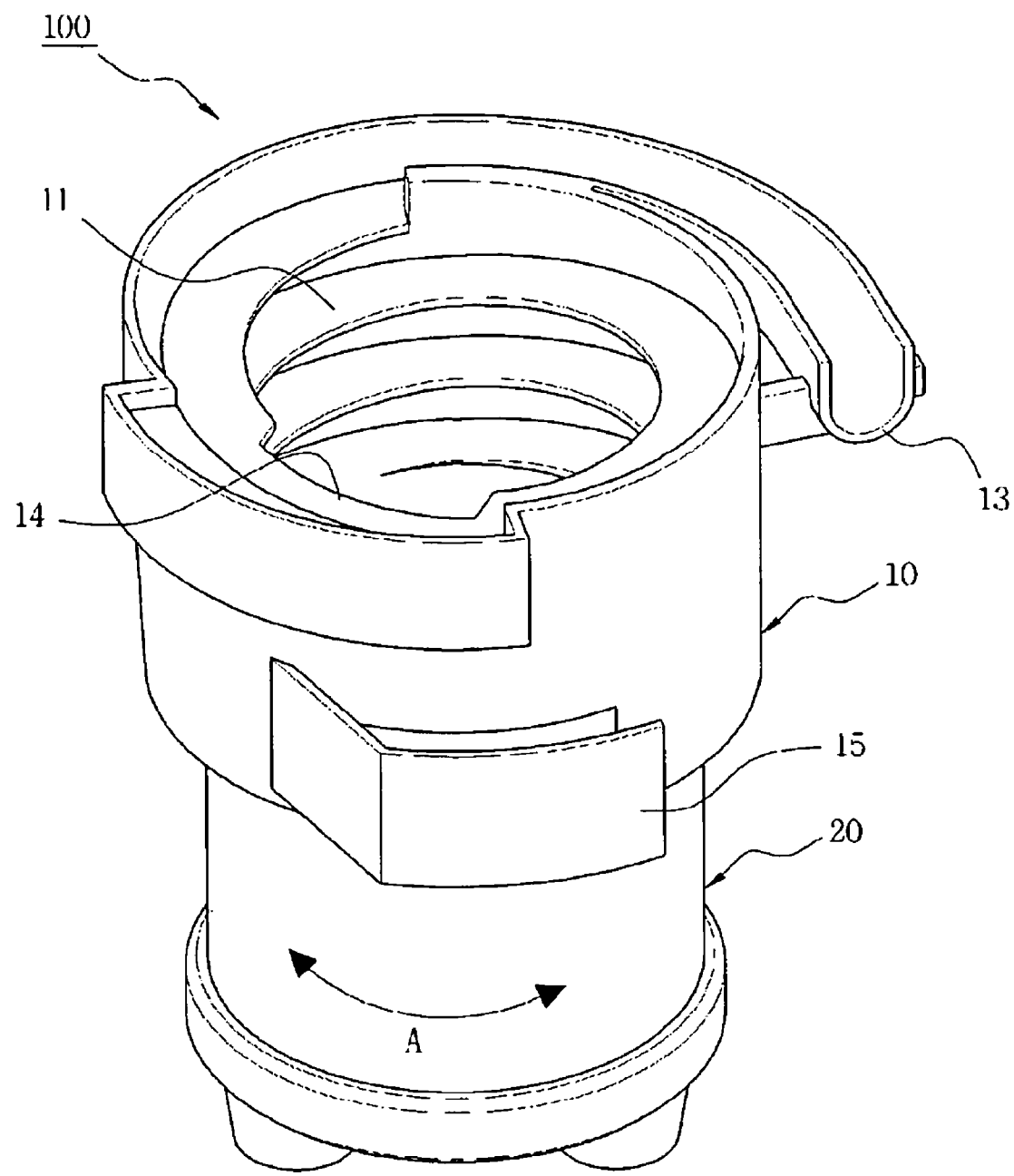

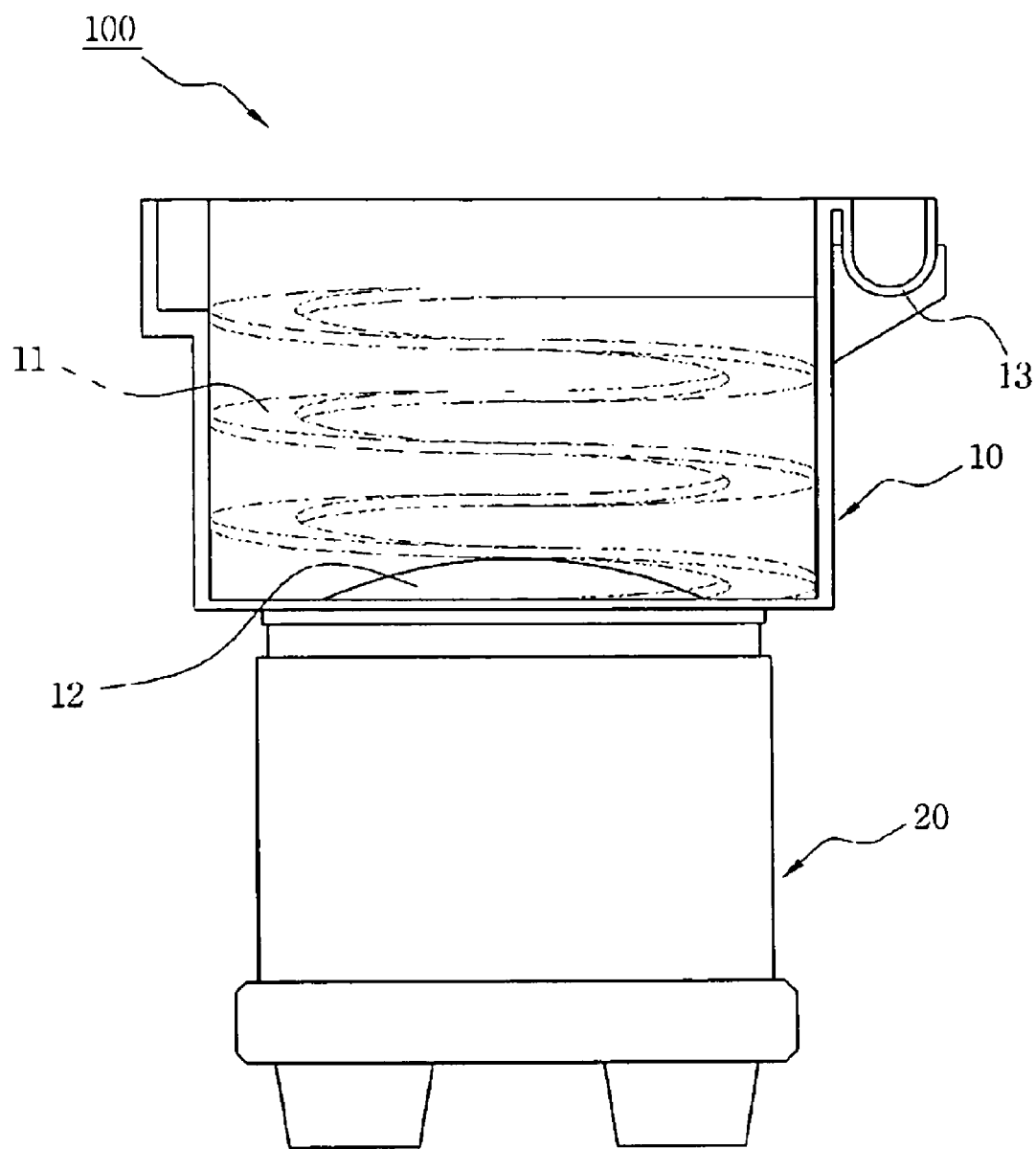
[Fig. 3]

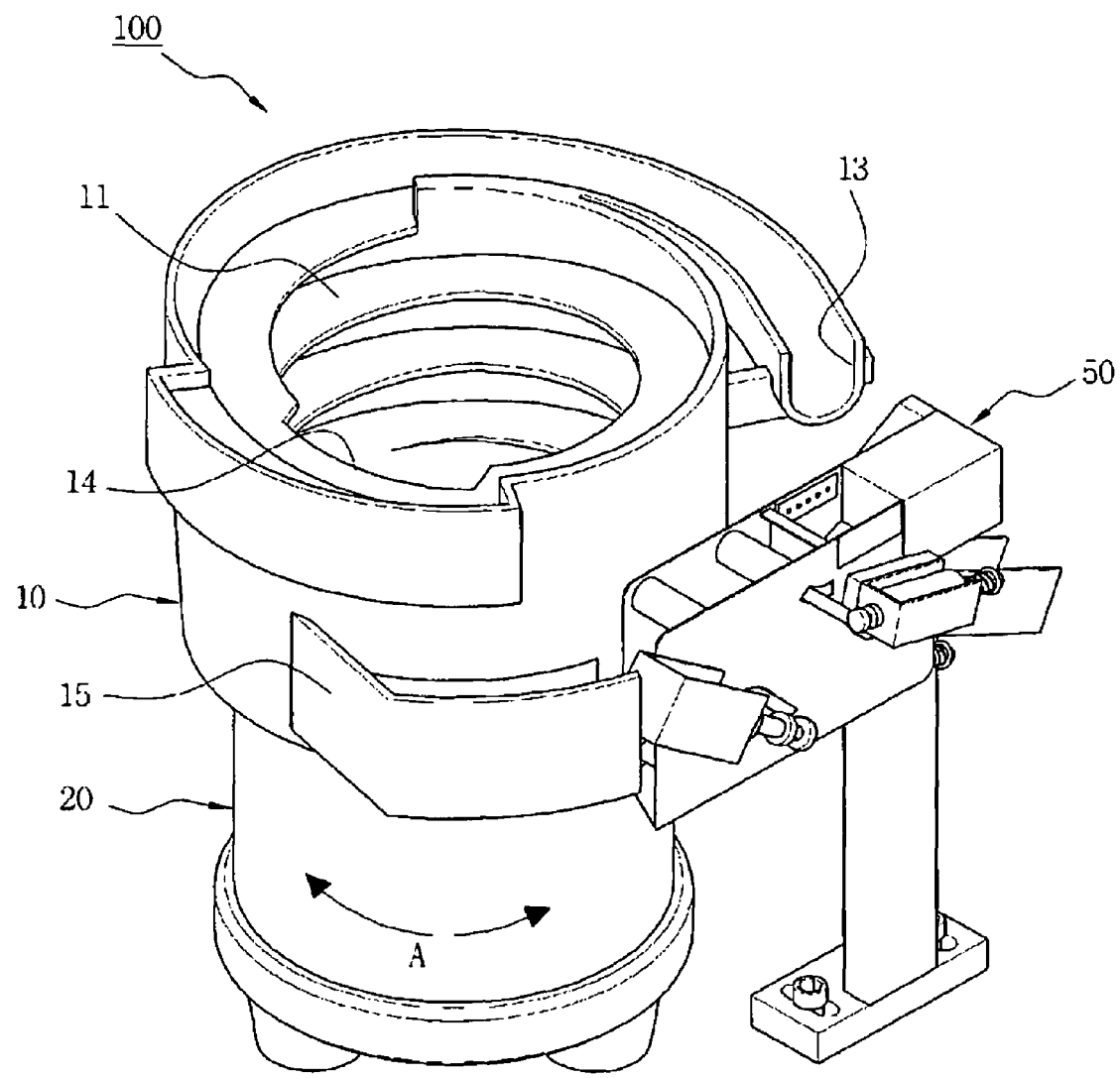
[Fig. 4]

[Fig. 5]
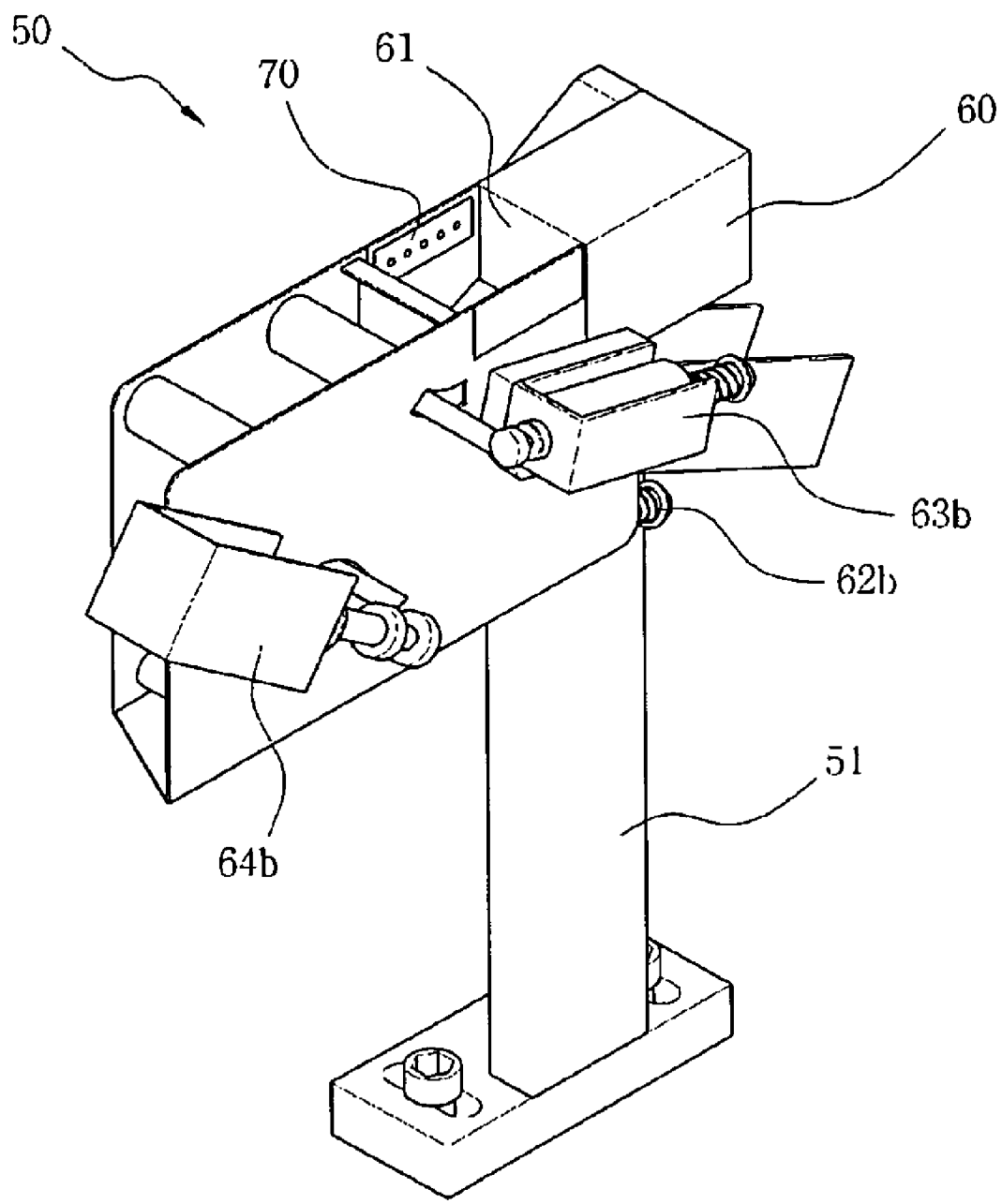

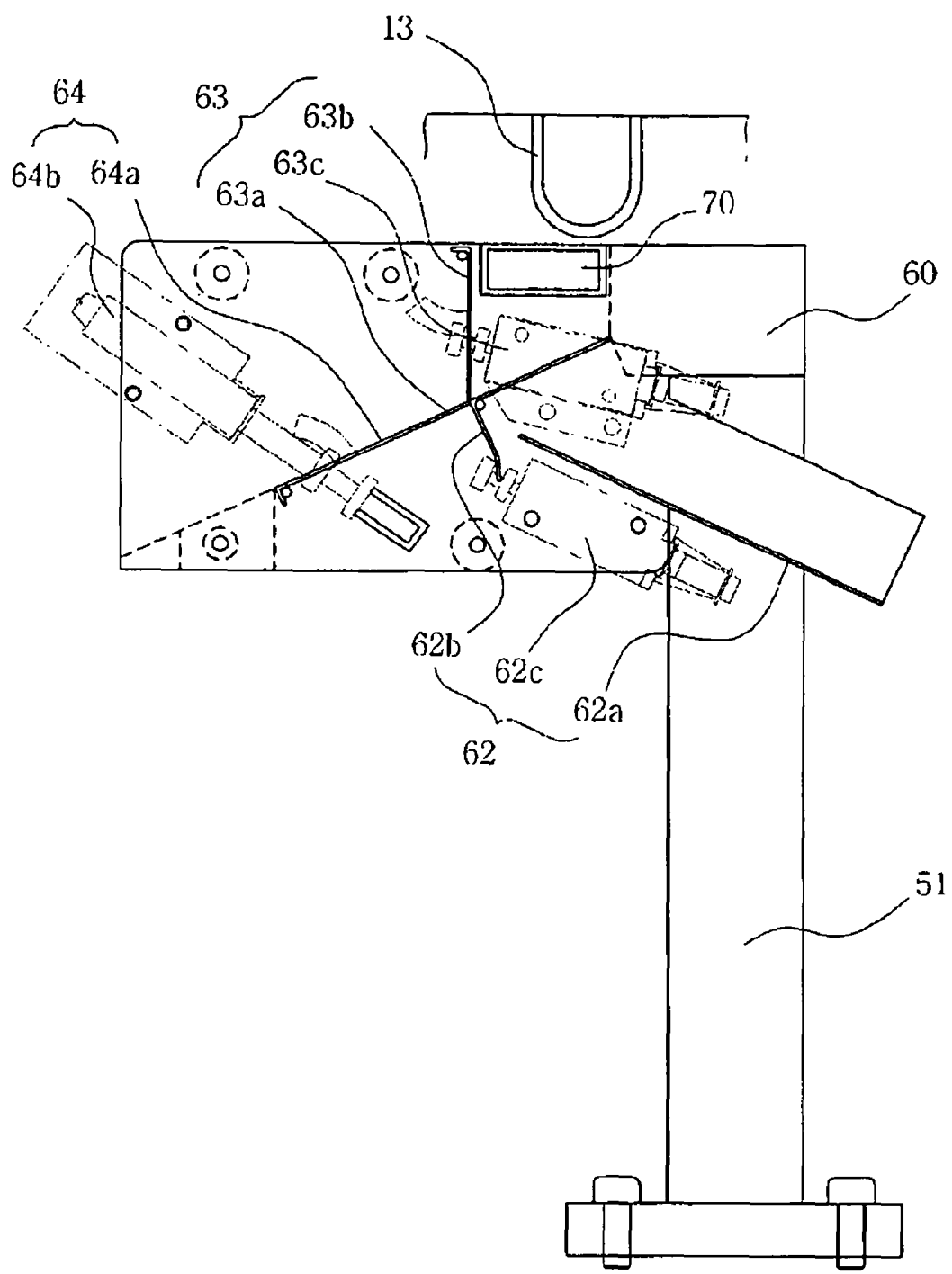
[Fig. 6]

[Fig. 7]
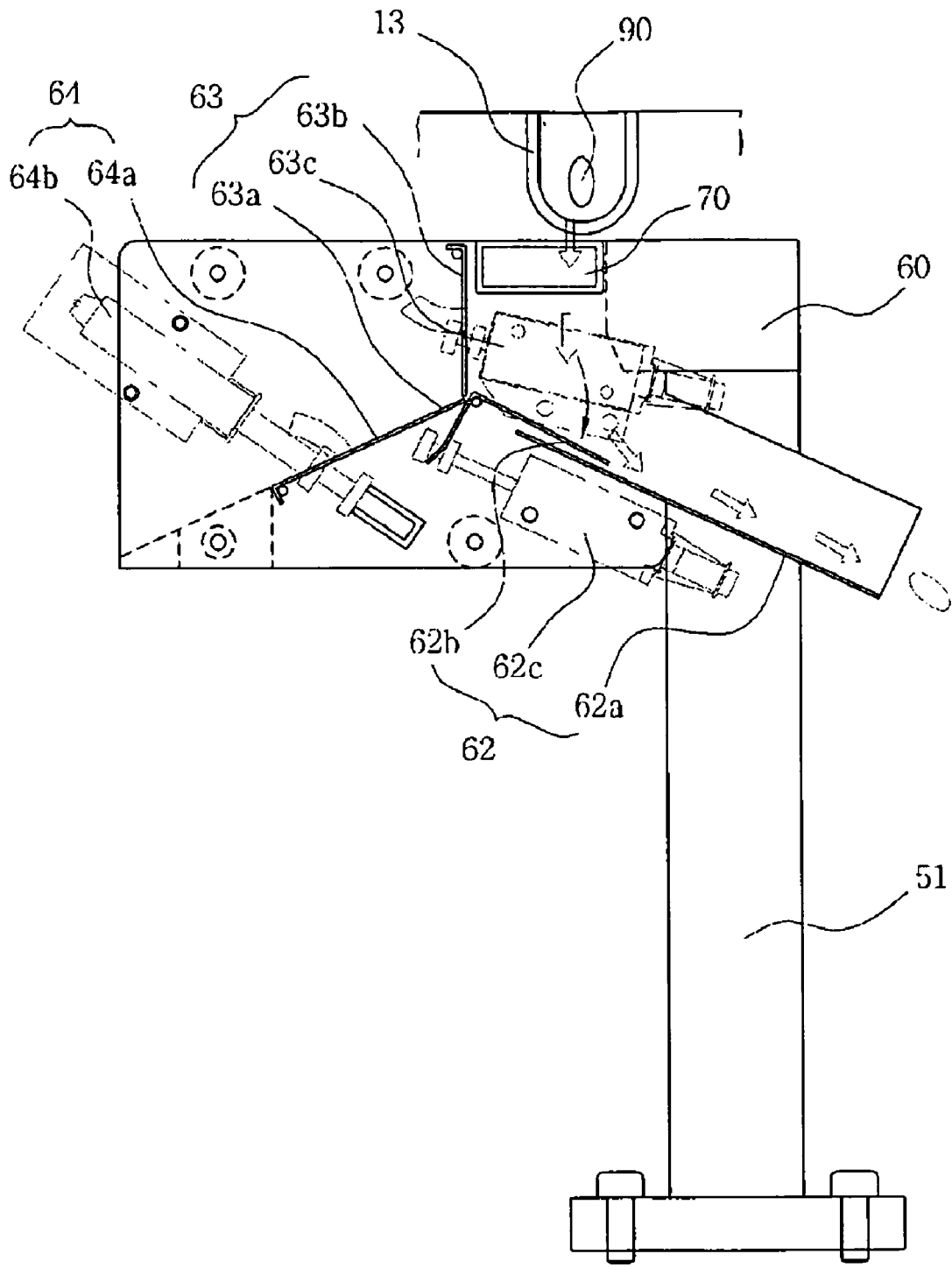

[Fig. 8]
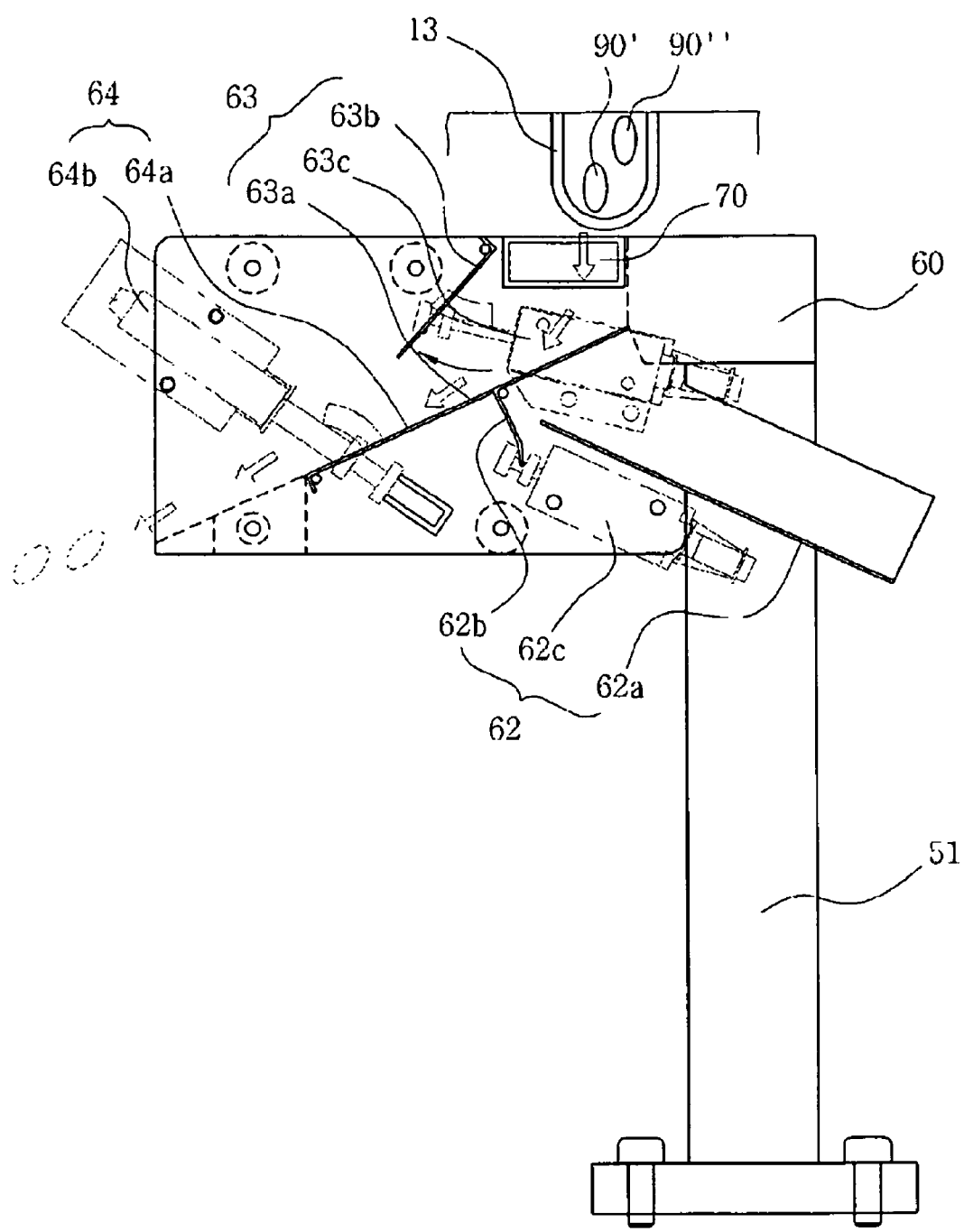

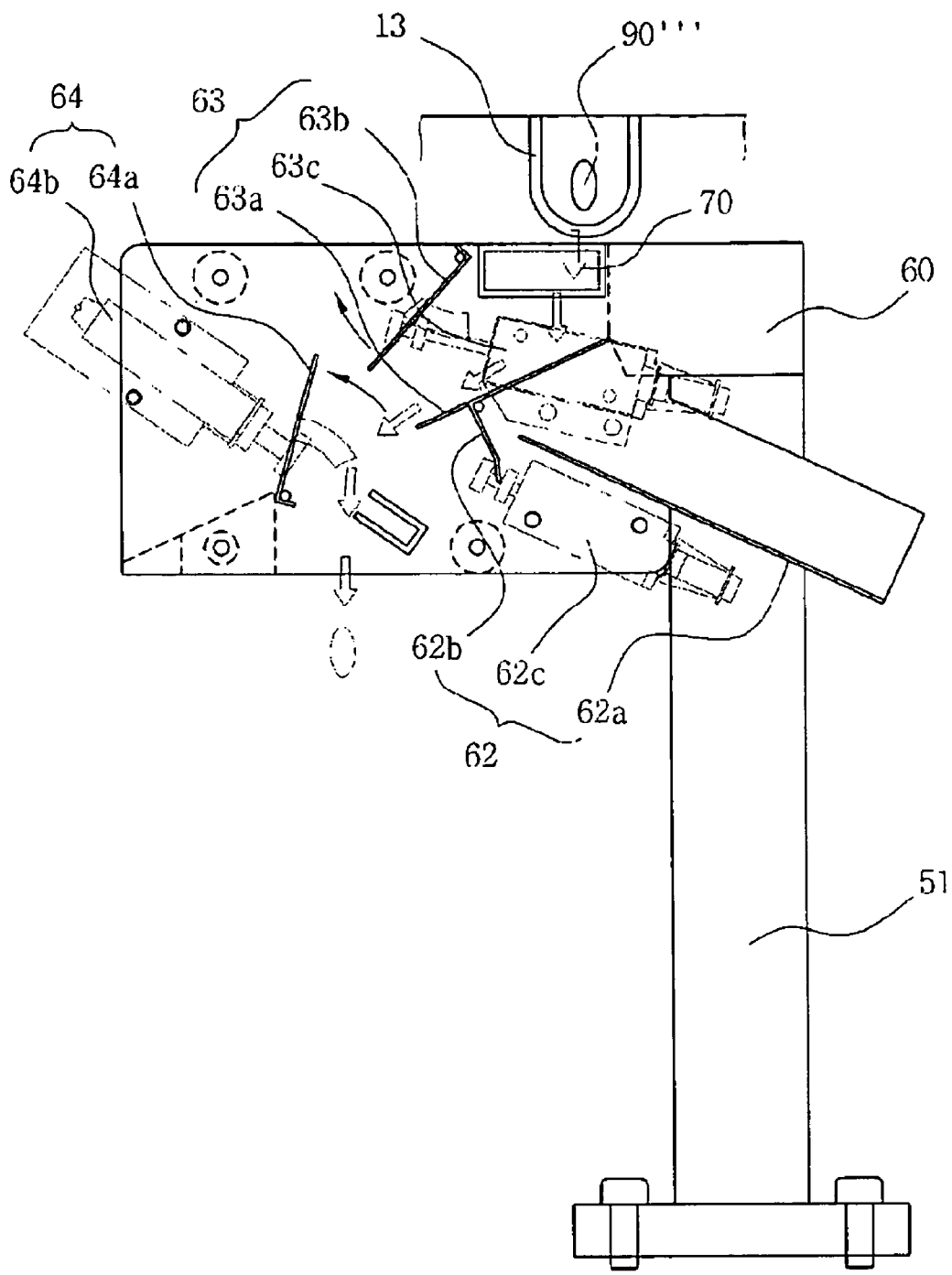
[Fig. 9]

[Fig. 10]
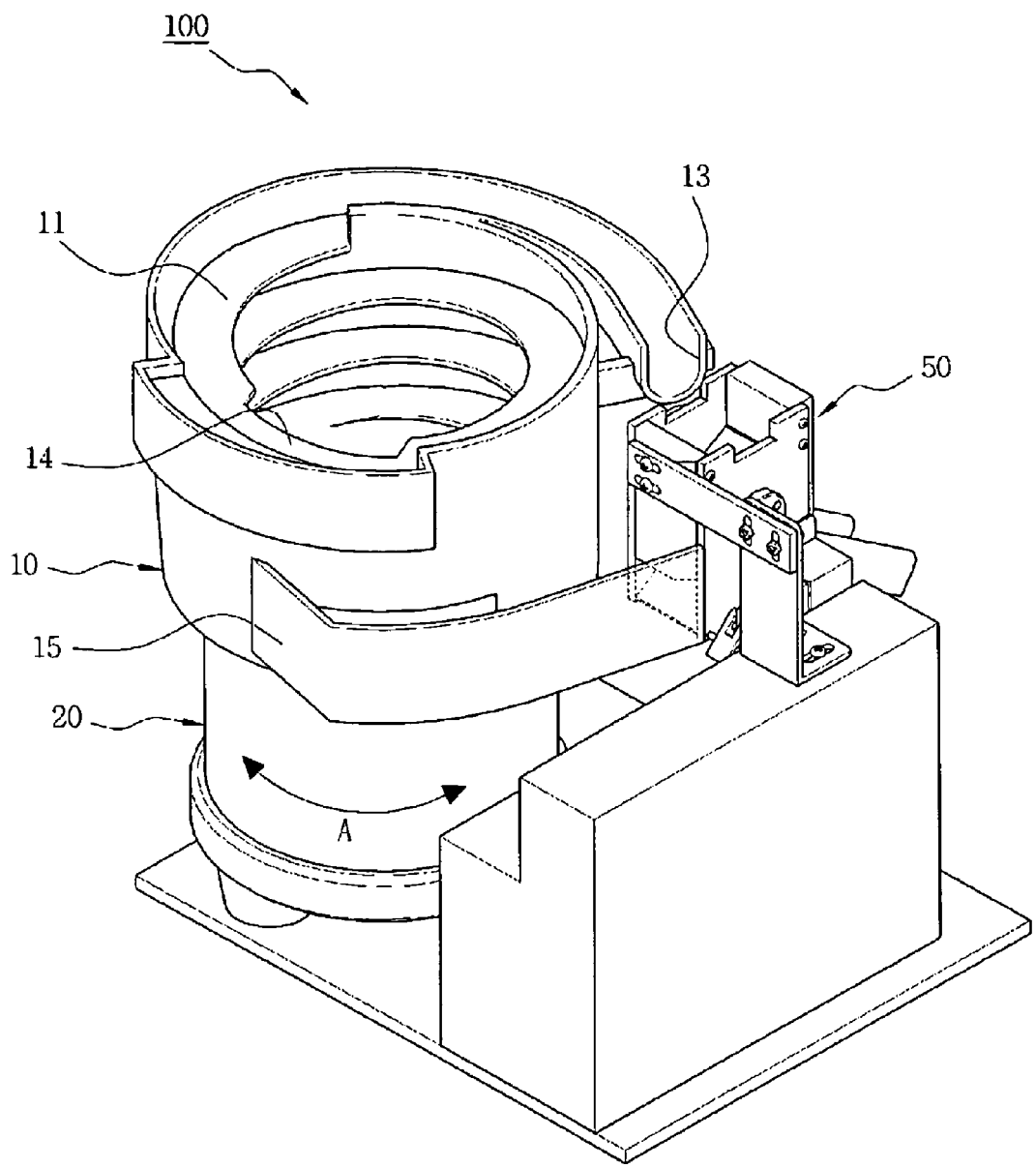

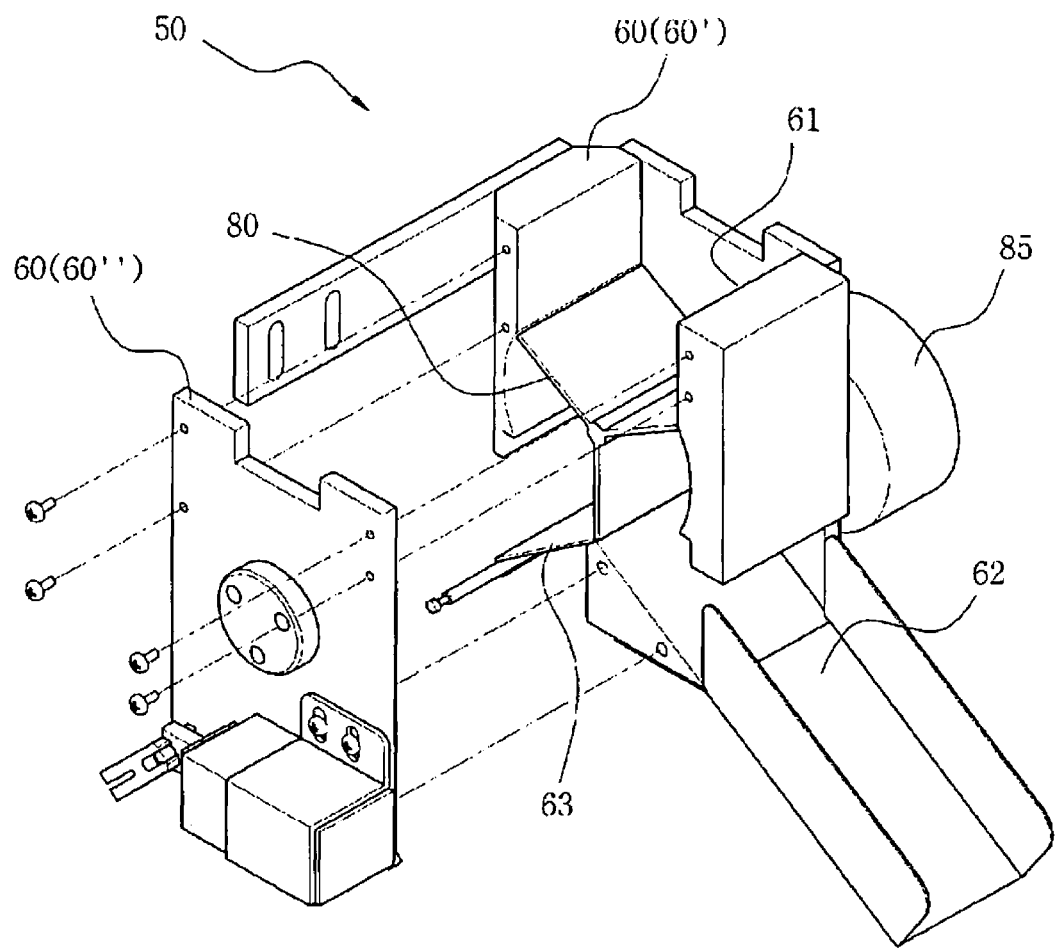
[Fig. 11]

[Fig. 12]
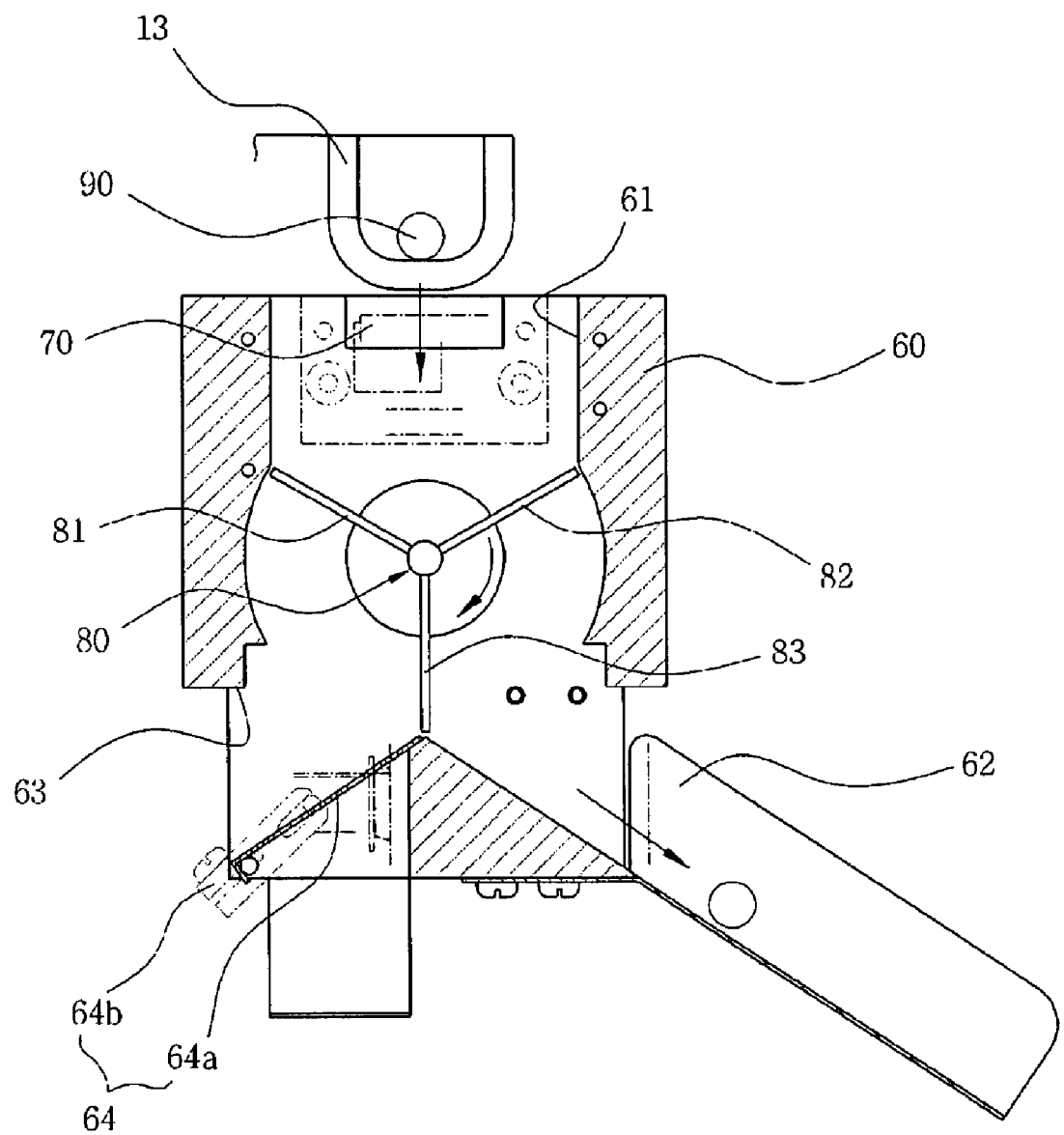

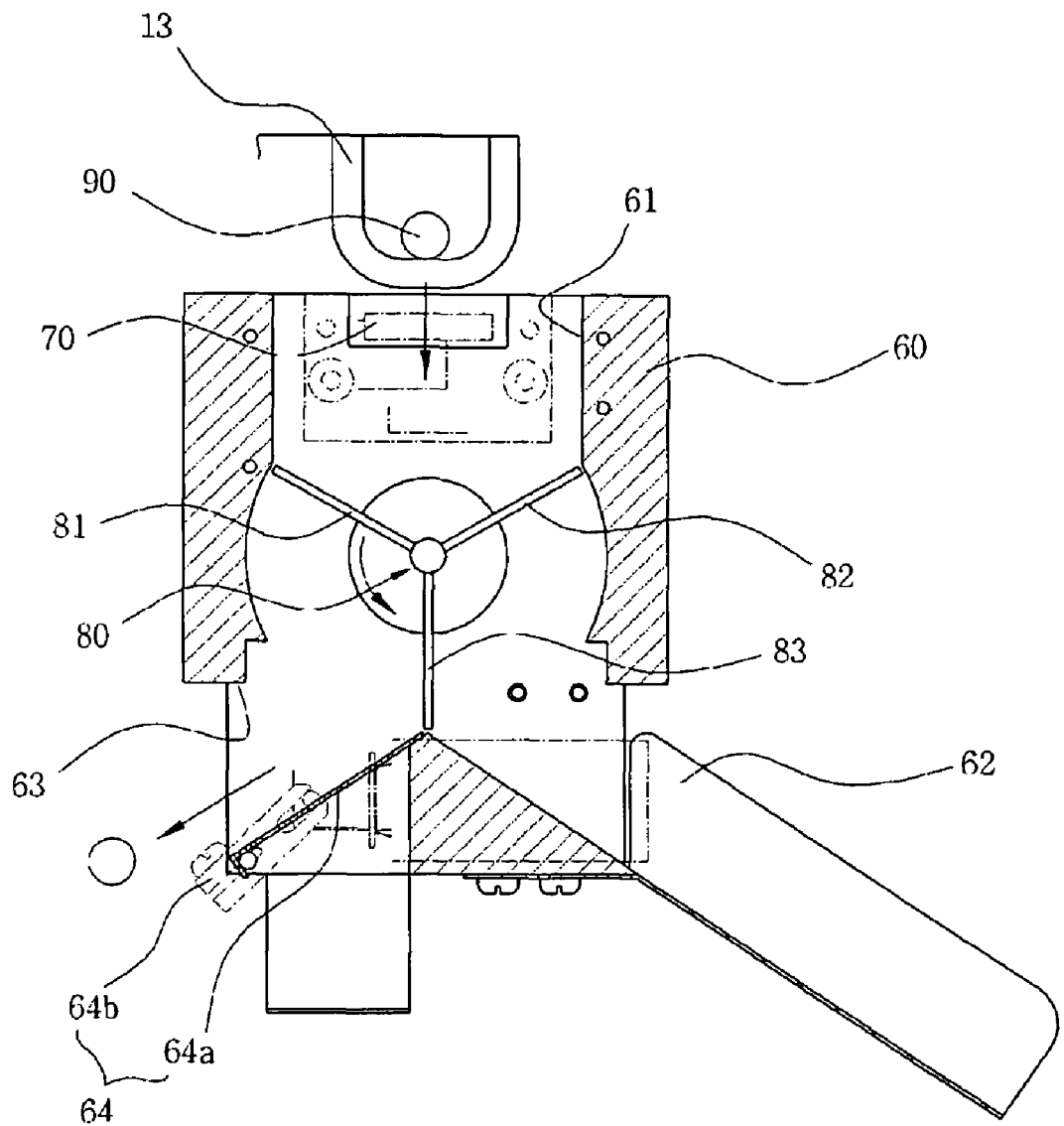
[Fig. 13]

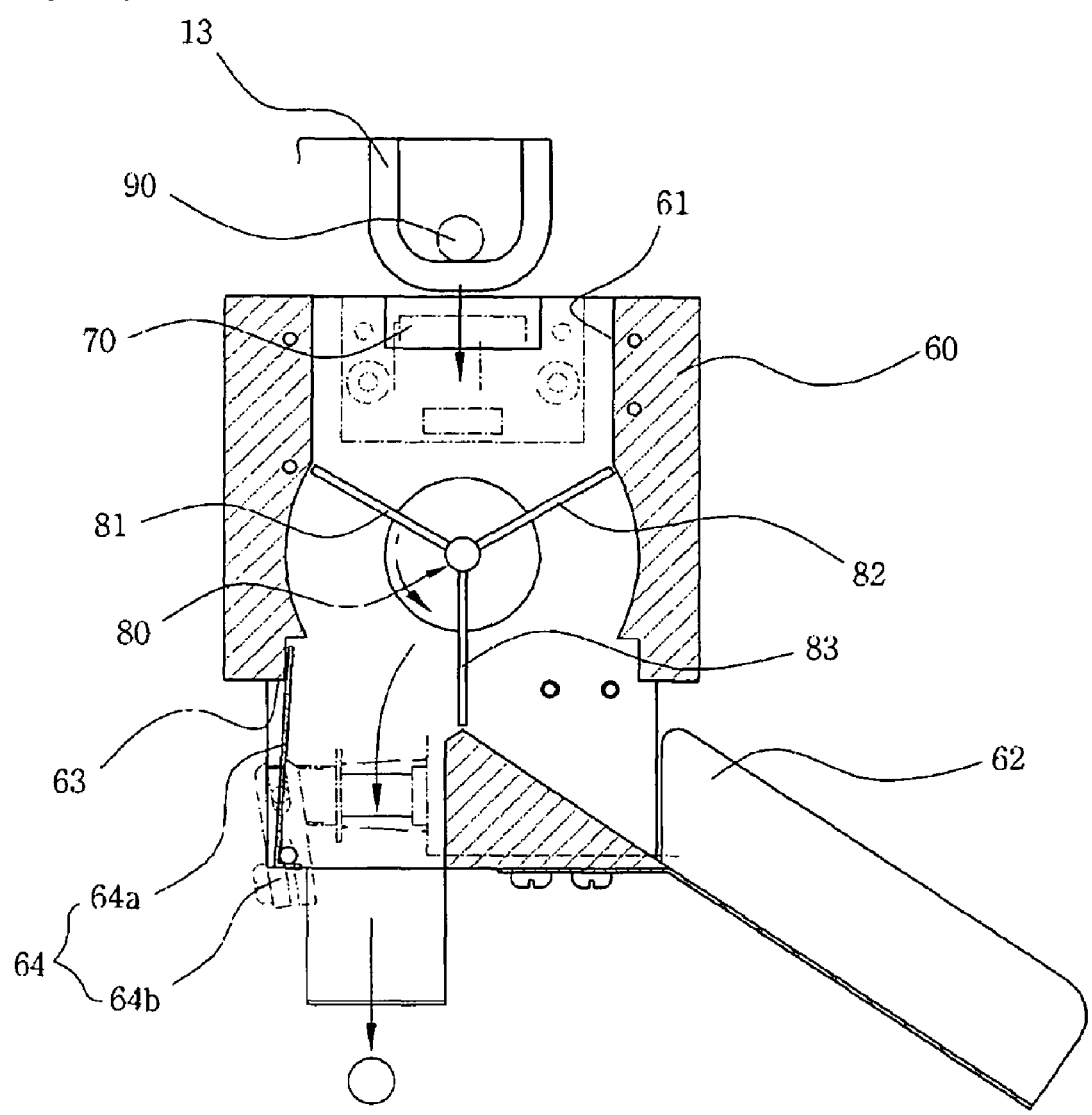
[Fig. 14]

[Fig. 15]
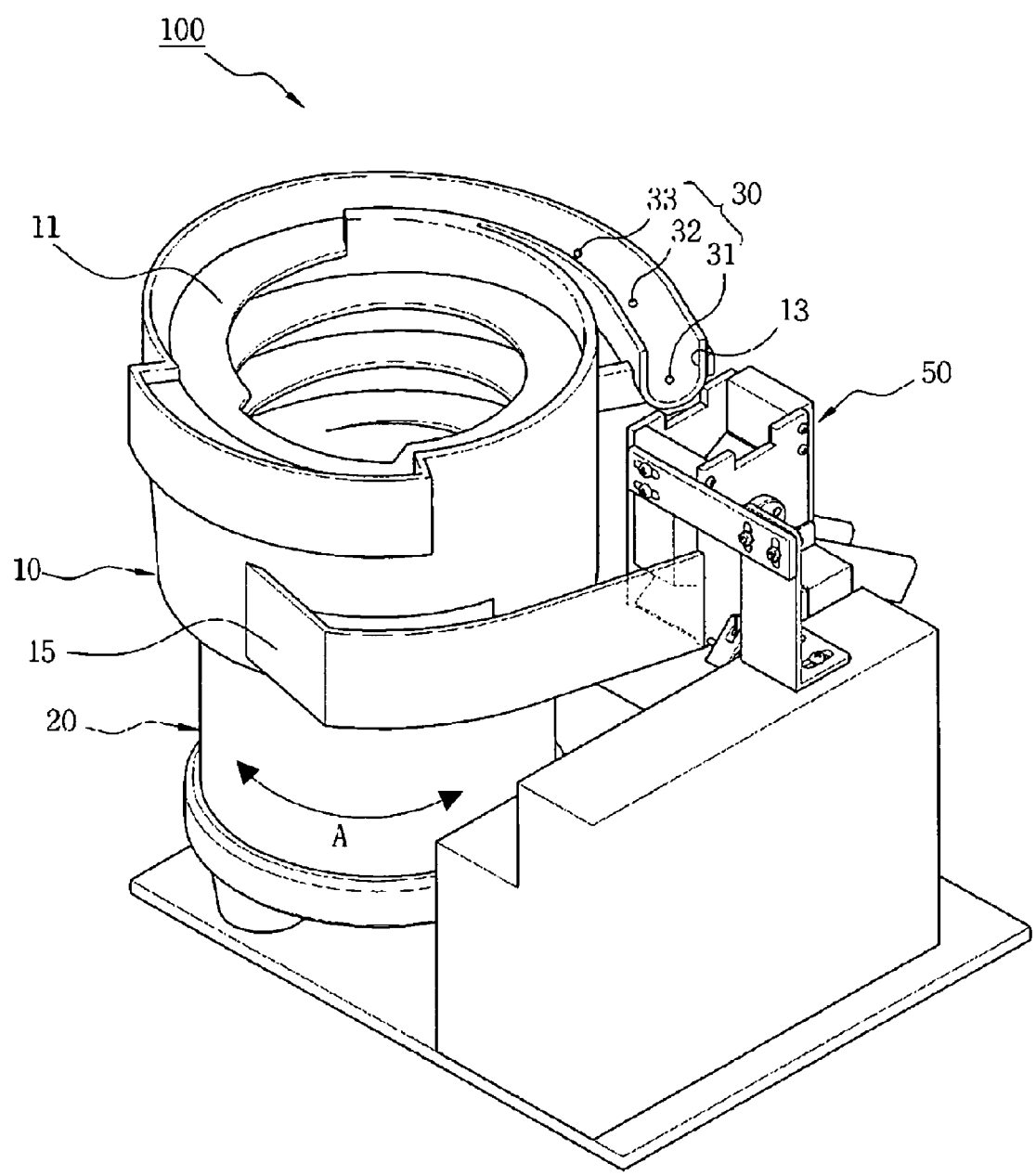

[Fig. 16]
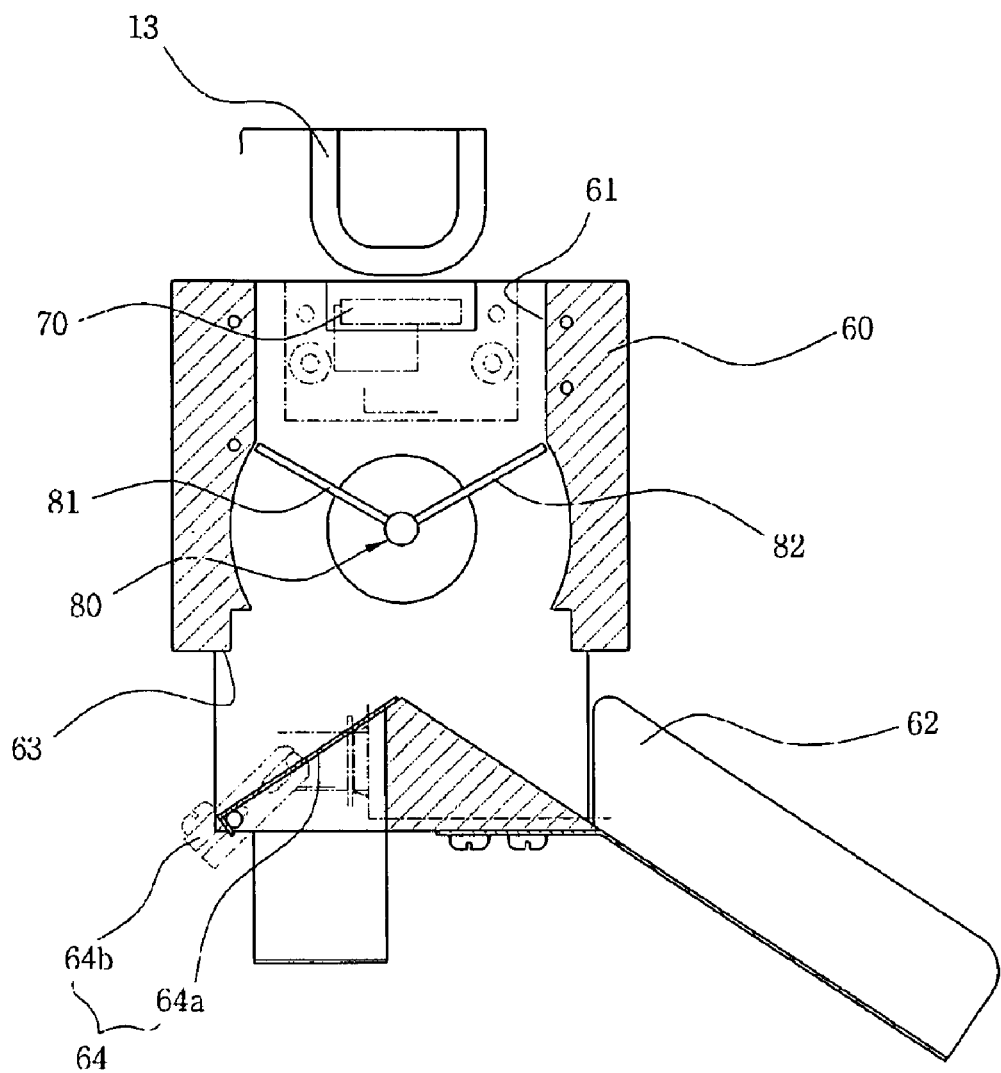
[Fig. 17]
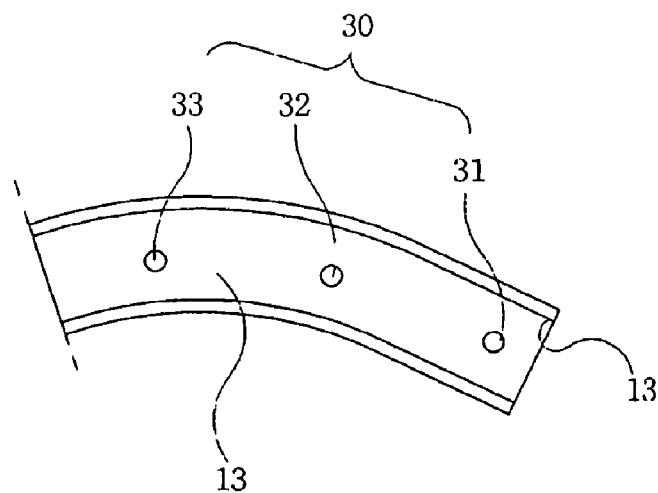

DISPENSER OF AUTOMATICALLY DISTRIBUTING VARIOUS SHAPED TABLETS IN MEDICINE PACKING MACHINE AND TABLET DISPENSING METHOD THEREOF

TECHNICAL FIELD

The following description relates to an automatic tablet dispenser of automatically distributing various shaped tablets and an automatic tablet dispensing method thereof, and more particularly, to an automatic tablet dispenser of automatically distributing various shaped tablets using vibration and automatically packing them, and an automatic tablet dispensing method thereof.

BACKGROUND ART

In general, an automatic medicine packing machine is used to automatically pack tablets when a doctor or pharmacist prepares a medicine based on a prescription at hospital or drugstore.

Conventional medicine packing machine can be classified into manual packing machines and automatic packing machines. The manual packing machine and the automatic packing machine are different in view of distributing tablets manually or automatically, but the same in view of automatically packing tablets and discharging medicine packages to the outside.

That is, the manual packing machine includes a circular or quadrilateral distribution tray with a plurality of holes. A doctor or pharmacist puts tablets into the holes manually, generally, puts tablets corresponding to a dose of medicine into each hole. The tablets put into the holes are packed by a packing unit provided in the lower portion of the manual packing machine, and then discharged to the outside.

Also, the automatic packing machine includes a plurality of cassettes which are arranged in the form of a plurality of drawers or in the form of a plurality of drums, in the upper portion. Tablets are classified depending on their kinds and stored in the cassettes. The tablets stored in the cassettes are discharged from the cassettes based on data received from a computer interfacing the automatic packing machine. The discharged tablets are collected in a hopper provided below the cassettes, and packed in the packing unit provided below the hopper.

The manual packing machine can be manufactured as a small-sized machine, and suitable to be used at a small drugstore or hospital, and the automatic packing machine is suitable to be used at a large drugstore or hospital where a large amount of medicines is prepared. Also, a combination of a manual packing machine and automatic packing machine is being used at some drugstores or hospitals.

However, cassettes installed in a conventional automatic packing machine cannot automatically discharge pieces of tablets such as half tablets or various-shaped tablets. Accordingly, pieces of tablets or various-shaped tablets should be supplied manually using a manual packing machine. Accordingly, the conventional medicine packing machine has a problem that a time consumed to prepare a medicine is long and reliability of medication is low due to mistakes, such as overdosage or under-dosage of medication.

Meanwhile, since in the conventional medicine packing machine a doctor or pharmacist picks up and distributes tablets with his or her hand, there is a risk of bacterial infection due to the direct contact of the hand or other mediums. If tablets infected with even a bit of bacteria due to the direct contact of a human's hand, etc. are absorbed in the body, this may cause fatal diseases to serious cases with low immunity.

DISCLOSURE OF INVENTION

Technical Solution

Accordingly, there are provided an automatic tablet dispenser of automatically distributing various-shaped tablets in a medicine packing machine, and an automatic tablet dispensing method thereof, which can automatically pack various-shaped tablets, and accurately, cleanly and rapidly distribute the tablets without missing any.

Advantageous Effects

Therefore, according to the automatic tablet dispenser and the automatic tablet dispensing method thereof, it is possible to automatically pack various-shaped tablets, and accurately, cleanly and rapidly distribute the tablets without missing any.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 1 is a construction view of an automatic medicine packing machine according to an embodiment of the present invention;

FIG. 2 is a perspective view of an automatic tablet dispenser according to an embodiment of the present invention, which is used in the automatic medicine packing machine illustrated in FIG. 1;

FIG. 3 is a cross-sectional view of the automatic tablet dispenser illustrated in FIG. 2;

FIG. 4 is a perspective view of an automatic tablet dispenser according to another embodiment of the present invention;

FIG. 5 is a perspective view of a quantity regulating module according to an embodiment of the present invention, which is used in the automatic tablet dispenser illustrated in FIG. 4;

FIG. 6 is a cross-sectional view of the quantity regulating module illustrated in FIG. 5;

FIGS. 7, 8 and 9 show the operation states of the quantity regulating module illustrated in FIG. 5;

FIG. 10 is a perspective view of a quantity regulating module according to another embodiment of the present invention;

FIG. 11 is an exploded perspective view of the quantity regulating module illustrated in FIG. 10;

FIGS. 12, 13 and 14 show the operation states of the quantity regulating module illustrated in FIG. 10, according to another embodiment of the present invention;

FIG. 15 is a cross-sectional view of a quantity regulating module according to another embodiment of the present invention;

FIG. 16 is a perspective view of an automatic tablet dispenser in which a guide track includes a sensor unit, according to another embodiment of the present invention; and FIG. 17 is a plan view of the guide track including the sensor unit illustrated in FIG. 16.

MODE FOR THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numbers in the drawings denote like elements.

FIG. 1 is a construction view of an automatic medicine packing machine 200 according to an embodiment of the present invention, FIG. 2 is a perspective view of an automatic tablet dispenser 100 according to an embodiment of the present invention, which is used in the automatic medicine packing machine 200 illustrated in FIG. 1, and FIG. 3 is a cross-sectional view of the automatic tablet dispenser 100 illustrated in FIG. 2.

Referring to FIG. 1, the automatic medicine packing machine 200 includes a plurality of cassettes 110 storing tablets therein and arranged in tiers, a hopper 120 collecting tablets therein and provided below the cassettes 110, an automatic tablet dispenser 100 supplying tablets to the hopper 120, and a packing unit 130 located below the hopper 120 to pack tablets collected therein and discharge them to the outside.

The automatic tablet dispenser 100 supplies tablets by a predetermined number to the hopper 120 so that the tables are packed together with tablets supplied from the cassettes 110.

As illustrated in FIGS. 2 and 3, the automatic tablet dispenser 100 includes a body 10 and a driver 20.

The body 10 has a space in which tablets are contained, and a guide track 11. The guide track 11 guides tablets contained in the space to be transferred upward, and has an upward path to move tablets upward.

The driver 20 is connected to one side of the body 10, and vibrates the body 10 to move tablets upward along the guide track 11. The driver 20 may be coupled with the lower portion of the body 10. The driver 20 rotates at regular angles to make a vibration. The vibration made by the driver 20 is a fine rotational vibration, and rotates and vibrates the body 10 because the driver 20 is coupled with the body 10. Here, noise caused by the vibration made by the driver 20 can be suppressed.

The body 10 can be manufactured in various shapes. In the current embodiment, the body 10 is in a cylinder shape whose upper part is open and whose lower part is closed. The body 10 may be made of synthetic resin or other proper materials which are relatively light and have high strength. The body 10 can be filled with tablets by pouring them therein through the upper part which is open. Also, by closing the upper part of the body 10 and providing a separate hole penetrating through a part of the body 10, tablets can be supplied to the body 10 through the hole.

The guide track 11 is formed in a spiral shape from the bottom 12 to upper part of the body 10, along the inner wall of the space. Tablets contained in the body 10 are heaped up from the bottom 12 of the body 10, and tablets staying on the bottom 12 of the body 10 are transferred upward in a line along the guide track 11. As such, the guide track 11 guides tablets contained in the body 10 to be arranged in a line and transferred upward.

The guide track 11 is manufactured separately and attached to the inner wall of the body 10, or formed as a single unit with the body 10. The slope of the spiral path of the guide track 11 is set to a slope at which tablets can smoothly move upward by the vibration of the driver 20. For example, if the height of the body 10 is about 10 cm, it will be suitable for the guide track 11 to have about three windings. Meanwhile, the guide track 11 includes a track outlet 13 for discharging tablets transferred from the bottom to the upper part of the body 10.

The driver 20 may be detachably coupled with the body 10. By detachably coupling the driver 120 with the body 10, the use and repair of the body 10 can be facilitated.

The bottom of the body 10 may be convex in such a manner that the center of the bottom is protruded upward. Accordingly, tablets put into the body 10 move smoothly to the edge of the body 19, so that a time consumed to move the tablets to the track outlet 13 is reduced.

The guide track 11 can further include at least one narrow part 14. The narrow part 14 is formed with a width narrower than that of the guide track 11, to move tablets in a line. The narrow part 14 is formed at a proper part of the guide track 11. The narrow part 14 with the width narrower than the remaining pan of the guide track 11 moves tablets transferred along the guide track 11 one by one in a line.

That is, when half tablets or small-sized tablets move upward along the guide track 11, there may be the case that two or more tablets move together. When two tablets pass the narrow part 14, one of the two tablets is pushed out and thus falls down on the bottom 12 of the body 10 because the width of the narrow part 14 is narrow.

The operation of the automatic tablet dispenser 100 constructed above will be described below.

First, tablets that are to be packed are put into the body 10 through the upper part of the body 10 and heaped up from the bottom 12 of the body 10. At this time, if the body 10 is rotated and vibrated by the driver 20 located below the body 10, the tablets move to the edge of the space by centrifugal force. The tablets move upward along the guide track 11 in the inner circumference of the body 10, and then are discharged through the track outlet 13.

Accordingly, the automatic tablet dispenser 100 according to the current embodiment arranges tablets in a line and distributes them one by one only by at once pouring the tablets into the body 10, thereby reducing a time consumed to prepare a medicine, compared to the case that a doctor or pharmacist has to distribute tablets one by one with his or her hand.

Particularly, the automatic tablet dispenser 100 can automatically distribute and pack various shaped tablets, such as half tablets, quarter tablets, tablet pieces, uneven shapes, longish shapes, polygon shapes and so on. This is because the automatic tablet dispenser 100 moves tablets along the guide track 11 using the driver 20, and free falls down the tablets from the track outlet 13 of the guide track 11.

That is, since the automatic tablet dispenser 100 transfers and discharges tablets only using vibration force generated by the driver 20 and gravitation, without contacting the tablets with a separate device, various shaped tablets can be distributed without missing or being broken.

FIG. 4 is a perspective view of an automatic tablet dispenser 100 according to another embodiment of the present invention, FIG. 5 is a perspective view of a quantity regulating module 50 according to an embodiment of the present invention, and FIG. 6 is a cross-sectional view of the quantity regulating module illustrated in FIG. 5.

As illustrated in FIG. 4, the automatic tablet dispenser 100 according to the current embodiment have the same construction as the automatic tablet dispenser 100 illustrated in FIG. 2, except for further including the quantity regulating module 50. Accordingly, in FIGS. 2 and 4, like reference numbers denote like elements. Referring to FIGS. 4, 5 and 6, the quantity regulating module 50 controls the number of tablets falling down from the track outlet 12 of the guide tack 11, and supplies the tablets to the hopper 120 of the medicine packing machine 200 (see FIG. 1).

The quantity regulating module 50 is installed in one side of the body 10, controls the number of tablets transferred in a line from the guide track 11, and supplies the tablets by a predetermined number to the hopper 120. That is, the quantity regulating module 50 counts the number of tablets transferred in a line and falling down from the guide track 11. If the count satisfies desired quantity, the counted tablets are discharged to the hopper 120, and if the count does not satisfy the desired quantity, the counted tablets are recollected to be redistributed, or discharged to the outside.

According to an embodiment of the present invention, the quantity regulating module 50 includes a module body 60, a detecting sensor 70, and a controller.

The module body 60 includes an inlet 61, a hopper-side supply part 62, and a recollecting part 63. The inlet 61 is a passage through which tablets falling down from the outlet 12 of the guide track 11 are put into the hopper-side supply part 62. The hopper-side supply part 62 is used to supply the tablets to the hopper 120. The recollecting part 63 returns tablets into the body 10.

The detecting sensor 70 is disposed at a proper location within the module body 60, to count the number of tablets put into the inlet 61. The detecting sensor 70 may be installed adjacent to the inlet 61. The detecting sensor 70 has to sense any tablet without missing it.

The detecting sensor 70 may include at least one light-emitting part for emitting light, and at least one light-receiving part for receiving the light emitted from the light-emitting part and sensing the presence of a tablet passing through the inlet 61, which are not illustrated in the drawings. The detecting sensor 70 counts the number of objects (that is, the number of tablets) passing between the light-emitting part and light-receiving part by receiving light emitted from the light-emitting part. Specifically, the light-emitting part is positioned in correspondence to the light-receiving part so that tablets passing between the light-emitting part and light-receiving part can be more correctly sensed.

The controller compares the number of tablets detected by the detecting sensor 70 to a predetermined quantity, transfers the tablets to the hopper-side supply part 62 if the number of tablets is equal to the predetermined quantity, and transfers the tablets to the recollecting part 63 if the number of tablets exceeds the predetermined quantity.

The controller interfaces the detecting sensor 70 to compare the number of tablets counted by the detecting sensor 70 to a predetermined quantity input through key manipulation. Then, if the number of tablets sensed by the detecting sensor 70 is equal to the predetermined quantity, the tablets are transferred to the hopper 120 and packed by the packing unit 130. However, if the number of tablets sensed by the detecting sensor 70 exceeds the predetermined quantity, the tablets are fed back to the body 10 so that they can be redistributed.

Also, the quantity regulating module 50 can further include a bedplate 51 and be supported firmly on the bottom by the bedplate 51.

According to an embodiment of the present invention, the hopper-side supply part 62 includes a hopper-side passage 62a, a first door 62b for opening or closing the hopper-side passage 62a, and a first solenoid 62c for driving the first door 62b. Also, the recollecting part 63 includes a recollecting passage 63a, a second door 63b for opening or closing the recollecting passage 63a, and a second solenoid 63c for driving the second door 63b.

The hopper-side passage 62a guides tablets put through the inlet 61 to be supplied to the hopper 120. The first door 62b, which is disposed adjacent to one end of the hopper-side passage 62a, is rotated by a hinge to open or close the hopper-side passage 62a using the first solenoid 62c. Tablets put into the inlet 61 are returned to the body 10 via the recollecting passage 63a. The second door 63b, which is disposed adjacent to one end of the recollecting passage 63a, returns tablets put through the inlet 61 into the body 10. The second door 63b, which is disposed adjacent to one end of the recollecting passage 63a, is rotated by a hinge to open and close the recollecting passage 63a using the second solenoid 63c.

Here, the body 10 includes a recollecting barrel 15 which is disposed below the body 10 and is open to the space of the body 10. Tablets transferred from the recollecting part 63 are recollected in the recollecting barrel 15 and again enter the space of the body 10.

Also, the recollecting part 63 can further include an outlet 64. The outlet 64 includes a third door 64a for discharging tablets to the outside, and a third solenoid 64b for driving the third door 64a.

Meanwhile, the controller controls transfer speed of tablets in such a manner as to accelerate vibration of the driver 20 until the detecting sensor 70 senses the presence of a tablet, to maintain the vibration of the driver 20 constant if the number of tablets sensed by the detecting sensor 70 is equal to a predetermined quantity, and to decelerate the vibration of the driver 20 if the number of tablets sensed by the detecting sensor 70 exceeds the predetermined quantity.

Accordingly, when the driver 20 starts to vibrate after tablets are put into the body 10, the tablets can move rapidly from the inlet to the outlet of the body 10. Meanwhile, when a tablet falls down from the track outlet 13 of the guide track 11 and is sensed by the detecting sensor 70, if the number of tablets fallen down is equal to a predetermined quantity, the vibration of the driver 20 is maintained constant. However, if the number of tablets fallen down exceeds the predetermined quantity, the vibration of the driver 20 decelerates. When speed at which tablets are transferred is too high, the number of tablets fallen down may exceed the predetermined quantity. Accordingly, in order to overcome failure where a tablet is undesirably fallen down, it is needed to decelerate vibration of the driver 20 and cause tablets to fall down one by one.

Meanwhile, the guide track 11 further includes a sub sensor for sensing whether a tablet reaches the track outlet 13, and the controller maintains vibration of the driver 20 constant when the sub sensor senses the presence of a tablet.

By installing the sub sensor, it is possible to more effectively control the vibration of the driver 20, compared to the case of maintaining the vibration of the driver 20 constant only when the detecting sensor 70 senses the presence of a tablet. That is, since the sub sensor is installed on the guide track 11, the sub sensor can detect the presence of a tablet reaching the outlet 13 of the guide track 11, before the detecting sensor 70 detects the presence of the tablet. Accordingly, the transfer speed of the tablet can be controlled in advance before it is fallen down.

Also, the quantity regulating module 50 can further include a stopper. The stopper drops a tablet at the end of the outlet 13 of the guide track 11 into the inlet 61 just when the detecting sensor 50 senses the presence of the tablet, and prevents the following tablet from falling down.

The stopper may be formed on the track outlet 13 of the guide track 11 or formed separately. The stopper may be in the shape of a door to open or close the outlet 13 of the guide track 11, to drop a tablet at the end of the outlet 13 promptly into the inlet 61 and prevent the following tablet from falling down.

As such, the stopper reduces a time consumed by the detecting sensor 11 to sense the presence of a tablet, as well as preventing an unwanted dropping of a tablet.

According to an embodiment of the present invention, the operation of the quantity regulating module 50 will be described in detail with reference to FIGS. 7, 8 and 9. Here, it is assumed that a predetermined quantity is one tablet. FIGS. 7, 8 and 9 show the operation states of the quantity regulating module 50 according to the current embodiment of the present invention.

As illustrated in FIG. 7, when a tablet 90 is sensed by the detecting sensor 70, the controller opens the hopper-side supply part 62 and controls for the tablet 90 to move toward the hopper 120. The tablet 90 is collected in the hopper 120 along with tablets discharged from the cassette 110 of the medicine packing machine 200, and all the tablets are packed in the packing unit 130.

Meanwhile, as illustrated in FIG. 8, when the number of tablets sensed by the detecting sensor 70 is two, that is, when an unwanted dropping of a tablet 90" occurs, or when two tablets 90' and 90" fall down together, the controller opens the recollecting part 63 and recollects the two tablets 90' and 90" so that the two tablets 90' and 90" can be distributed later.

Also, when the operation of the automatic medicine packing machine 200 has to be stopped to discharge tablets contained in the body 10 to the outside, as illustrated in FIG. 9, the discharge unit 64 is opened while opening the recollecting part 63 so that the tablets can be discharged to the outside.

The technical construction of a quantity regulating module 50 according to another embodiment of the present invention will be described in detail with reference to FIGS. 10 and 11, below.

FIG. 10 is a perspective view of the quantity regulating module 50 according to another embodiment of the present invention, and FIG. 11 is an exploded perspective view of the quantity regulating module 50 illustrated in FIG. 10.

As illustrated in FIGS. 10 and 11, a module body 60 includes a rotating member 80 and a motor 85.

The rotating member 80 includes wings 81, 82 and 83 disposed below the inlet 61 and arranged in the radial direction. The rotating member 80 receives a tablet 90 falling down from the inlet 61 between the wings 81, 82 and 83, and discharges the tablet 90 selectively to the hopper-side supply part 62 or to the recollecting part 63.

The motor 85 rotates the rotating member 80 forward or backward, that is, in a clockwise direction or in a counterclockwise direction, under the control of the controller.

That is, the rotating member 80 is connected to the motor 85 and rotated forward or backward, that is, in a clockwise direction or in a counterclockwise direction, in the module body 60. The wings 81, 82 and 83 are arranged in the radial direction, for example, in the shape of a wind sail or waterwheel. For example, the motor 85 is installed in the rear of a back module body 60', the rotating member 80 is linked to the axis of the motor 85, and then a front module body 60" is coupled with the back module body 60', thereby completing an assembly. The hopper-side supply part 62 and the recollecting part 63 are disposed below the rotating member 80, so that tablets fallen on the rotating member 80 are discharged to the hopper 120 or to the recollecting barrel 15 of the body 10.

In this case, the wings 81, 82 and 83 may be positioned at angles of 120°. As such, if the wings 81, 82 and 83 are positioned at the same interval of 120°, the wings 81, 82 and 83 can efficiently receive and discharge tablets. However, it will be understood by one of those skilled in the art that a plurality of wings can be positioned at predetermined angles, for example, at angles of 90°.

The operation of the quantity regulating module 50 will be described in detail with reference to FIGS. 12, 13 and 14, below.

FIG. 12 is a view for explaining operation of discharging a tablet 90 fallen down from the track outlet 13 of the body 10 to the hopper-side supply part 62 when a total number of tablets counted by the detecting sensor 70 is equal to a predetermined quantity. That is, a tablet 90 discharged from the track outlet 13 falls down between the first and second wings 81 and 82 of the rotating member 80 via the detecting sensor 70. Here, since the total number of tablets sensed by the detecting sensor 70 is equal to the predetermined quantity, the rotating member 80 is rotated by 120° in the clockwise direction, so that the tablets staying between the first and second wings 81 and 82 are discharged to the hopper-side supply part 62.

FIG. 13 is a view for explaining operation of recollecting a tablet 90 fallen down from the track outlet 13 of the body 10 into the recollecting part 63 when the total number of tablets counted by the detecting sensor 70 exceeds the predetermined quantity. That is, a tablet 90 discharged from the track outlet 13 falls down between the first and second wings 81 and 82 of the rotating member 80 via the detecting sensor 70. Here, since the total number of tablets sensed by the detecting sensor 70 exceeds the predetermined quantity, the rotating member 80 is rotated by 120° in the counter-clockwise direction, so that the tablets staying between the first and second wings 81 and 82 are discharged to the recollecting part 63.

In this case, the module body 60 can further include a discharge unit 64 for discharging the tablet 90 transferred to the recollecting part 63 to the outside. Also, the discharge unit 64 may include a door 64a for discharging the tablet 90 to the outside and a solenoid 64a for driving the door 64a, in one side of the discharge unit 64.

FIG. 14 is a view for explaining operation of recollecting a tablet 90 fallen down from the track outlet 13 of the body 10 into the recollecting part 63 when the total number of tablets counted by the detecting sensor 70 exceeds the predetermined quantity, or operation of discharging the tablet 90 to the outside when a user turns off the automatic tablet dispenser 100. That is, the tablet 90 discharged from the track outlet 13 falls down between the first and second wings 81 and 82 via the detecting sensor 70. At this time, if the quantity regulating module 50 is in a discharge mode, the rotating member 80 is rotated by 120° in the counterclockwise direction, and the door 64a connected to the solenoid 64b is opened, so that the tablet 90 is discharged to the outside.

As such, if the door 64a can be rotated, smooth driving is possible and no noise is generated. Furthermore, a phenomenon where tablets are stuck to the inner wall of the module body 60 and pile up when the tablets are discharged is prevented, thus avoiding a wrong operation. Also, when the first, second and third wings 81, 82 and 83 of the rotating member 80 are rotated, a tablet dropped between the first and second wings 81 and 82 by a single rotation is discharged to the hopper-side supply part 62 or recollecting part 63, and simultaneously the third wind 83 is ready to receive a tablet to fall through the inlet 61, so that the entire structure becomes stable and energy efficiency is enhanced.

FIG. 15 is a cross-sectional view of a quantity regulating module according to another embodiment of the present invention.

As illustrated in FIG. 15, a rotating member 80 includes two wings 81 and 82. A tablet staying between the two wings 81 and 82 is rotated in the clockwise direction or in the counterclockwise direction, and discharged selectively to the hopper-side supply part 62 or recollecting part 63.

FIG. 16 is a perspective view of an automatic tablet dispenser in which a guide track 11 includes a sensor unit 30, according to an embodiment of the present invention, and FIG. 17 is a plan view of the guide track 11 including the sensor unit 30.

As shown in FIGS. 16 and 17, a body 10 includes the sensor unit 30 and a controller.

The sensor unit 30, which is positioned at a track outlet 13 of the guide track 11, senses whether a tablet exists at the track outlet 13 of the guide track 11. That is, the sensor unit 30 can determine whether a tablet exists at the track outlet 13 of the guide track 11 by sensing whether or not the tablet passes through the track outlet 13. The sensor unit 30 includes a plurality of sensors 31, 32 and 33. The sensor unit 30 includes a light-emitting part for emitting light and a light-receiving part for receiving emitted light. As described above, tablets contained in the body 10 are moved upward along the guide track 11 by vibration of a driver 20. Here, the sensor unit 30 determines whether a tablet reaches the track outlet 13 of the guide track 11.

The controller controls the driver 20. That is, the controller accelerates or decelerates vibration of the driver 20, thus controlling the transfer speed of a tablet which is transferred along the guide track 11. The controller controls the driver 20 to raise the transfer speed of a tablet, until the sensor unit 30 senses the tablet. Meanwhile, the controller controls the driver 20 to lower the transfer speed of a tablet, when the controller determines that the sensor unit 30 senses the presence of the tablet and the tablet is located at the track outlet 13 of the guide track 11.

It is not preferable that the transfer speed of tablets moving along the guide track 11 is too high or low. If the transfer speed of tablets is too high, two or more tablets may be undesirably together discharged, or a following tablet is swept off and discharged by inertia force even when the driver 20 stops. On the contrary, if the transfer speed of tablets is too low, the tablets are discharged too slowly and accordingly a time consumed to prepare a medicine increases.

Accordingly, the transfer speed of tablets moving along the guide track 11 has to be maintained proper. If the transfer speed of tablets is maintained constant, a time consumed to transfer tablets from the bottom of the body 10 to the outlet 13 of the guide track 11 when the driver starts to operate may increase. However, according to the current embodiment, by installing the sensor unit 30 and controller, it is possible to minimize a time consumed to transfer tablets from the inlet of the guide track 11, which is a start location of tablets, to the track outlet 13 which is an arrival location of the tablets.

Meanwhile, the sensor unit 30 may include the first sensor 31 and the second sensor 33. The first sensor 31 is spaced by a predetermined distance from the outlet 13 of the guide track 11. Meanwhile, the second sensor 33 is spaced by a predetermined distance from the first sensor 31, toward the inlet of the guide track 11. The first and second sensors 31 and 33 sense whether a tablet passes through them, thus determining whether a tablet is located between them.

Also, the sensor unit 30 can further include an intermediate sensor 32 between the first and second sensors 31 and 33. The intermediate sensor 32 precisely senses the presence of a tablet passing therethrough. It is also possible to provide a plurality of intermediate sensors 32.

Meanwhile, a tablet supply method according to an embodiment of the present invention includes driving operation, sensing operation and control operation.

In the driving operation, the driver 20 vibrates the body 10 so that tablets contained in the body 10 are moved upward along the guide track 11.

In the sensing operation, it is sensed whether a tablet exists at the track outlet 13 of the guide track 11, thus determining whether the tablet reaches the track outlet 13 of the guide track 11 from the bottom of the body 11. The sensing of the tablet is performed by the sensor unit 30 disposed in the track outlet of the guide track 11.

In the control operation, the transfer speed of tablets moving along the guide track 11 is controlled. That is, the controller accelerates vibration of the driver 20 to increase the transfer speed of tablets, until the sensor unit 30 senses the presence of a tablet. Meanwhile, when the sensor unit 30 senses the presence of a tablet, the controller decelerates the vibration of the driver 20, thus lowering the transfer speed of tablets.

It will be apparent to those skilled in the at that various modifications and variations can be made in the present invention without departing from the spirit or scope of the invention. Thus, it is intended that the present invention covers the modifications and variations of this invention provided they come within the scope of the appended claims and their equivalents.

INDUSTRIAL APPLICABILITY

The automatic tablet dispenser according to the present invention can be applied to various automatic packing machines.

The invention claimed is:

1. An automatic tablet dispenser which is installed in a medicine packing machine for automatically packing tablets, the automatic tablet dispenser comprising:
    a body including a space for containing the tablets therein and a guide track for guiding the tablets contained in the space upward from a bottom of the body;
    a driver vibrating the body so that the tablets contained in the space of the body are transferred upward along the guide track; and
    a quantity regulating module controlling the number of tablets falling down from an outlet of the guide track, and supplying the tablets to a hopper of the automatic tablet dispenser, the quantity regulating module comprising a module body comprising an inlet to which the tablets falling down from the outlet of the guide track are input, a hopper-side supply part for supplying the tablets to the hopper, and a recollecting part recollecting tablets in the body,
    wherein the module body further comprises:
        a rotating member, which is positioned below the inlet of the guide track, including a plurality of wings arranged in a radial direction, receiving a tablet falling down into the inlet of the guide track between the plurality of wings, and discharging the tablet selectively to the hopper-side supply part or to the recollecting part according to a rotation direction of the rotating member; and
        a motor rotating the rotating member forward or backward to open the hopper-side supply part or the recollecting part.

2. The automatic tablet dispenser of claim 1, wherein the body is in a shape of a cylinder, and the guide track is in a shape of a spiral.

3. The automatic tablet dispenser of claim 2, wherein the driver is detachably coupled with the body.

4. The automatic tablet dispenser of claim 2, wherein a bottom of the body is convex in such a manner that a center of the bottom is protruded upward.

5. The automatic tablet dispenser of claim 2, wherein the guide track comprises a narrow part having a width narrower than that of the guide track and arranging the tablets in a line.

6. The automatic tablet dispenser of claim 1, wherein the quantity regulating module further comprises:
- a detecting sensor counting the number of the tablets input to the inlet; and
- a controller comparing the counted number of tablets with a predetermined quantity, transferring the tablets to the hopper-side supply part when the counted number of tablets is equal to the predetermine quantity, and recollecting the tablets in the recollecting part when the counted number of tablets exceeds the predetermine quantity.

7. The automatic tablet dispenser of claim 6, wherein the hopper-side supply part comprises a hopper-side passage, a first door for opening or closing the hopper-side passage, and a first solenoid for driving the first door, and the recollecting part comprises a recollecting passage, a second door for opening or closing the recollecting passage, and a second solenoid for driving the second door.

8. The automatic tablet dispenser of claim 7, wherein the recollecting part further comprises a discharge unit including a third door for discharging the tablets to the outside and a third solenoid for driving the third door.

9. The automatic tablet dispenser of claim 6, wherein the controller controls transfer speed of the tablets to accelerate vibration of the driver until the detecting sensor senses presence of a tablet, to maintain the vibration of the driver constant when the number of tablets sensed by the detecting sensor is equal to the predetermined quantity, and to decelerate the vibration of the driver when the number of tablets sensed by the detecting sensor exceeds the predetermined quantity.

10. The automatic tablet dispenser of claim 9, wherein the guide track further comprises a sub sensor sensing whether a tablet reaches the outlet of the guide track, and the controller maintains the vibration of the driver constant when the sub sensor senses presence of the tablet.

11. The automatic tablet dispenser of claim 6, wherein the body comprises a recollecting barrel which is open to the space, below the body, so that a tablet transferred from the recollecting part is recollected in the recollecting barrel and again transferred to the space.

12. The automatic tablet dispenser of claim 6, further comprising a stopper dropping a tablet existing at an end of the outlet of the guide track promptly in the inlet of the module body, and preventing a following tablet from being dropped in the inlet of the module body, when the detecting sensor senses presence of a tablet.

13. The automatic tablet dispenser of claim 1, wherein the plurality of wings are arranged at angles of 120 degrees in the radial direction.

14. The automatic tablet dispenser of claim 1, wherein the module body further comprises a discharge unit for discharging the tablets transferred to the recollecting part to the outside.

15. The automatic tablet dispenser of claim 14, wherein the discharge unit comprises a door for discharging the tablets to the outside, and a solenoid for driving the door.

16. The automatic tablet dispenser of claim 1, wherein the body comprises:
- a plurality of sensor units disposed adjacent to an outlet of the guide track and sensing whether the transferred tablets are located adjacent to the outlet of the guide track; and
- a controller controlling the driver to decrease transfer speed of a tablet when the plurality of sensor units sense presence of the tablet.

17. The automatic tablet dispenser of claim 16, wherein the controller controls the driver to increase the transfer speed of the tablets, when the plurality of sensor units sense no tablet.

18. The automatic tablet dispenser of claim 16, wherein the plurality of sensor units comprises:
- a first sensor spaced from an end of the outlet of the guide track; and
- a second sensor spaced from the first sensor toward an inlet of the guide track.

19. The automatic tablet dispenser of claim 18, wherein the plurality of sensor units further comprise at least one intermediate sensor disposed between the first sensor and the second sensor and precisely sensing presence of a tablet passing therethrough.

20. A method of supplying tablets in a medicine packing machine, the method comprising:
- vibrating a body so that tablets contained in the body are transferred along a guide track;
- sensing presence of a tablet near an outlet of the guide track using at least one sensor disposed adjacent to the outlet of the guide track;
- controlling transfer speed of a tablet in such a manner as to accelerate vibration of a driver until the at least one sensor senses presence of the tablet, and decelerate the vibration of the driver after the at least one sensor senses the presence of the tablet; and
- regulating, by a quantity regulating module, the number of tablets falling down from an outlet of the guide track, and supplying the tablets to a hopper of the automatic tablet dispenser, wherein the quantity regulating module comprises a module body comprising an inlet to which the tablets falling down from the outlet of the guide track are input, a hopper-side supply part for supplying the tablets to the hopper, and a recollecting part recollecting tablets in the body, wherein the module body further comprises a rotating member, which is positioned below the inlet of the guide track, including a plurality of wings arranged in a radial direction, receiving a tablet falling down into the inlet of the guide track between the plurality of wings, and discharging the tablet selectively to the hopper-side supply part or to the recollecting part according to a rotation direction of the rotating member, and a motor rotating the rotating member forward or backward to open the hopper-side supply part or the recollecting part.

* * * * *